United States Patent [19]
Goretta et al.

[11] 3,933,763
[45] Jan. 20, 1976

[54] POLYMERIZATION OF MALEIC ANHYDRIDE AND VINYL ACETATE

[75] Inventors: Louis A. Goretta, Naperville; John D. Newkirk, Downers Grove, both of Ill.

[73] Assignee: Nalco Chemical Company, Chicago, Ill.

[22] Filed: July 18, 1974

[21] Appl. No.: 489,806

[52] U.S. Cl............ 260/78.5 R; 260/29.1 R; 260/875
[51] Int. Cl.²................................................. C08F 2/06
[58] Field of Search........... 260/78.5 R, 875, 878 R, 260/29.1 R

[56] References Cited
UNITED STATES PATENTS

| | | | |
|---|---|---|---|
| 3,660,339 | 5/1972 | Schuh | 260/29.7 D |
| 3,729,451 | 4/1973 | Blecke et al. | 260/78.5 R |

*Primary Examiner*—John Kight, III
*Attorney, Agent, or Firm*—Kinzer, Plyer, Dorn & McEachran

[57] ABSTRACT

Polymerization of maleic anhydride and vinyl acetate is carried out in the presence of a stabilizing agent prepared by copolymerizing maleic anhydride and an alpha-olefin.

5 Claims, No Drawings

POLYMERIZATION OF MALEIC ANHYDRIDE AND VINYL ACETATE

BACKGROUND OF THE INVENTION

This invention relates generally to the polymerization of maleic anhydride and vinyl acetate and more particularly concerns the problem of the product precipitating from solution causing severe plating and causing difficulty in agitating the mixture.

During copolymerization of maleic anhydride and vinyl acetate in solvents such as toluene or benzene, the copolymer plates out on the reactor surfaces such as the stirring blade or the walls of the reactor. The copolymer may also form balls of product which clog up the bottom of the reaction vessel. While conducting such polymerizations without stabilizers of the present invention, stirring rods have broken and vessels have been cracked due to the plated polymer and polymer balls. Accordingly, an object of the invention is to prevent severe plating or polymer balls from forming and hindering the reaction.

SUMMARY OF THE INVENTION

In accordance with the invention a stabilizing agent is added to the polymerization which alleviates the problem of severe plating and polymer ball formation of the product.

The stabilizing agent is made from maleic anhydride and an alpha-olefin containing from four to 18 carbon atoms. From 0.5 to 6% of these stabilizing agents, based upon the weight of the maleic anhydride desired to be polymerized with vinyl acetate, is added to the polymerization to achieve the desired results.

DETAILED DESCRIPTION OF THE INVENTION

While this invention will be described in connection with several experiments, it will be understood that it is not intended to limit the invention to these procedures. On the contrary, it is intended to cover all alternatives, modifications and equivalents as may be included within the spirit and scope of the invention as defined by the appended claims.

Experiment 1: Copolymerization of maleic anhydride with vinyl acetate without stabilizing agent.

To a mixture of 98 gm maleic anhydride, 4.0 gm thioglycolic acid, 1.0 gm azobisisobutyronitrile and 433 gm toluene at a temperature of 60°C and purged with nitrogen was added 43 gm of vinyl acetate and the nitrogen was stopped. Within five minutes the temperature rose to 78°C and the copolymer had plated enough to require scraping of the thermometer probe. After 27 minutes with a temperature of 68°C, the stirrer broke and the reaction was stopped.

Experiment 2: Copolymerization of maleic anhydride with vinyl acetate without stabilizing agent.

To a mixture of 98 gm maleic anhydride in 300 gm of toluene was added 1.0 gm azobisisobutyronitrile and 4.0 gm thioglycolic acid in 133 gm toluene. The mixture was purged with nitrogen at a temperature of 60°C. Over a period of 1 hour, 86 gm of vinyl acetate was added while the temperature was maintained at about 64°–69°C. The temperature was then maintained at about 66°–70°C while a thick viscous emulsion formed which was hard to stir and caused extensive plating on the reaction apparatus.

Experiment 3: Preparation of stabilizing agent.

To a mixture of maleic anhydride and excess hexene-1 in toluene was added a free radical initiator and the reaction was carried out to completion. The solvent and excess hexene-1 was vacuum stripped to leave a white powder in anhydride form. This stabilizing agent was protected from moisture prior to use in the copolymerization. Other stabilizing agents are similarly made by choosing different alpha-olefins such as butene-1, octadecene-1 or others with from 4 to 18 carbon atoms.

Experiment 4: Copolymerization of maleic anhydride with vinyl acetate including 2% of a stabilizing agent incorporating octadecene-1.

To a mixture of 98 gm maleic anhydride, 4 gm thioglycolic acid, 1 gm azobisisobutyronitrile, 2 gm stabilizing agent made from maleic anhydride and octadecene-1 prepared as in Experiment 3 and 433 gm toluene purged with nitrogen was added, 86 gm vinyl acetate over a period of 45 minutes, keeping the temperature at about 69°–75°C. A heavy suspension was obtained; however, it was easy to stir and no complications in stirring were encountered. The stabilizing agent was dissolved in 100 ml of hot toluene to aid dissolution.

Experiment 5: Copolymerization of maleic anhydride with vinyl acetate including a 4% stabilizing agent incorporating octadecene-1.

This experiment was conducted similar to Experiment 4 except that instead of 2 gm of the stabilizing agent made from maleic anhydride and octadecene-1, 4 gm was used. The vinyl acetate was added over a period of 40 minutes and the temperature maintained from about 66°–78°C. The product consisted of a heavy suspension, easily stirrable with no balling or severe plating observed.

Experiment 6: Copolymerization of maleic anhydride with vinyl acetate including 1% of a stabilizer incorporating hexene-1.

To a mixture of 98 gm of maleic anhydride, 4 gm of thioglycolic acid, 1 gm of azobisisobutyronitrile, 1 gm stabilizing agent made from maleic anhydride and hexene-1 in accordance with Experiment 3, and 433 gm toluene purged with nitrogen was added 86 gm of vinyl acetate. The vinyl acetate was added over a period of 70 minutes while the temperature was maintained at about 67°–71°C. There was considerable plating but no trouble with stirring and a desirable product was obtained.

Experiment 7: Copolymerization of maleic anhydride with vinyl acetate including 2% stabilizing agent incorporating hexene-1.

The reaction was conducted similarly to that of Experiment 6 except for 2 gm of the stabilizing agent made from maleic anhydride and hexene-1 instead of 1 gm. No problems with stirring or plating occurred.

Experiment 8: Copolymerization of maleic anhydride with vinyl acetate including 4% of a stabilizing agent incorporating hexene-1.

This reaction was conducted similarly to Experiment 6 except for 4 gm of the stabilizing agent made from maleic anhydride and hexene-1 of 1 gm and the vinyl acetate was added over a period of 55 minutes. No problems with stirring or plating occurred.

Thus, it is apparent that there has been provided in accordance with the invention a method that fully satisfies the objects, aims and advantages set forth above. While the invention has been described in conjunction with the specific embodiments thereof it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A method of polymerizing maleic anhydride and vinyl acetate in a solvent selected from the group consisting of toluene and benzene comprising carrying the polymerization out in the presence of a stabilizing agent comprising a copolymer of maleic anhydride and an alpha-olefin containing from four to 18 carbon atoms, the amount of stabilizing agent being from 0.5 to 6% by weight of maleic anhydride.

2. A method as in claim 1 wherein the alpha-olefin contains from six to 18 carbon atoms.

3. A method as in claim 1 wherein the stabilizing agent consists of a copolymer of maleic anhydride and hexene-1.

4. A method as in claim 1 wherein the stabilizing agent comprises a copolymer of maleic anhydride and octadecene-1.

5. A method as in claim 1 wherein the stabilizing agent is present in am amount from 0.1 to 4.0% by weight of maleic anhydride.

* * * * *